(12) United States Patent
Farrar

(10) Patent No.: US 10,390,519 B2
(45) Date of Patent: Aug. 27, 2019

(54) ANIMAL RESTRAINT DEVICE

(71) Applicant: Tim Farrar, Salt Lake City, UT (US)

(72) Inventor: Tim Farrar, Salt Lake City, UT (US)

(73) Assignee: Tim Farrar, Salt Lake City, UT (US)

( * ) Notice: Subject to any disclaimer, the term of this patent is extended or adjusted under 35 U.S.C. 154(b) by 221 days.

(21) Appl. No.: 15/240,528

(22) Filed: Aug. 18, 2016

(65) Prior Publication Data

US 2017/0049078 A1 Feb. 23, 2017

Related U.S. Application Data

(60) Provisional application No. 62/206,632, filed on Aug. 18, 2015.

(51) Int. Cl.
*A01K 27/00* (2006.01)

(52) U.S. Cl.
CPC .......... *A01K 27/003* (2013.01); *A01K 27/001* (2013.01)

(58) Field of Classification Search
CPC ..... A01K 27/00; A01K 27/004; A01K 27/003
See application file for complete search history.

(56) References Cited

U.S. PATENT DOCUMENTS

| | | | | |
|---|---|---|---|---|
| 4,765,279 A | * | 8/1988 | Klickstein | A01K 27/00 119/770 |
| 5,099,799 A | * | 3/1992 | Giacobbe | A01K 1/04 119/793 |
| D366,542 S | | 1/1996 | Pierson | |
| 5,497,733 A | | 3/1996 | Hull | |
| 5,806,467 A | * | 9/1998 | Arakawa | A01K 27/003 119/771 |
| 5,947,062 A | * | 9/1999 | Hoffman | A01K 27/003 119/769 |
| 6,367,428 B1 | | 4/2002 | Forte | |

(Continued)

FOREIGN PATENT DOCUMENTS

DE 102012100385 A1 * 7/2013 ........... A01K 27/001

OTHER PUBLICATIONS

"Eyecatchers Pet Wear Loop All-in-One Emergency Dog Leash and Collar". Found online 11/08/207 at amazon.com. Page dated Jul. 8, 2014. Retrieved from https://www.amazon.com/Eyecatchers-Pet-Wear-Emergency-Collar/dp/B00C663QPM/ref=va_dp_rp_1_B01FWUP221.

(Continued)

*Primary Examiner* — Kristen C Hayes
(74) *Attorney, Agent, or Firm* — Maschoff Brennan

(57) ABSTRACT

An animal restraint device includes an elongated member with an interior surface, an exterior surface, a posterior length, and a remaining length. A first connector is at a first end and a third connector is positioned at the second end of the elongated member. A second connector is positioned at a first distance from the first end. A fourth connector is positioned at a second distance from the second end. The fourth connector can be releasably attached to the third connector. A collar loop is formed from the posterior length through attachment of the first connector to the second connector. The elongated member is configurable in a storage configuration in which concentric loops are wrapped around the collar loop in a single rotational direction and affixed to the collar loop or a concentric loop and the second end is connected to the exterior surface of an outer-most concentric loop.

17 Claims, 7 Drawing Sheets

(56) References Cited

U.S. PATENT DOCUMENTS

| | | | |
|---|---|---|---|
| D523,188 S | 6/2006 | Lord | |
| 7,281,495 B2* | 10/2007 | Wagner | A01K 27/001 119/793 |
| D609,409 S | 2/2010 | Labelson | |
| D640,840 S | 6/2011 | Reed | |
| D683,085 S | 5/2013 | Parker | |
| D695,469 S | 12/2013 | Dougherty | |
| D699,405 S | 2/2014 | McKinnell | |
| D790,780 S | 6/2017 | Strengell | |
| 2006/0042562 A1 | 3/2006 | Wagner | |
| 2006/0137625 A1 | 6/2006 | Conte | |
| 2007/0006823 A1 | 1/2007 | Sandberg | |
| 2013/0174616 A1* | 7/2013 | Allen, Jr. | E05B 37/025 70/30 |
| 2013/0340687 A1 | 12/2013 | Palladino | |
| 2014/0096721 A1* | 4/2014 | Millard | A01K 27/001 119/792 |
| 2017/0049078 A1 | 2/2017 | Farrar | |

OTHER PUBLICATIONS

"All Ready Leash Dog Collar/Leash Combination". Found online Nov. 7, 2017 at amazon.com. Page dated Mar. 14, 2016. Retrieved from https://www.amazon.com/Red-Leash0Collar-Combination-Small/dp/B01CUJSL4U/ref=cm_cr_arp_d_product_top?ie=UTF8.

"Ruffwear Slackline Adjustable Leash". Found online Jan. 11, 2017 at thedogoutdoors.com. Page dated Jan. 25, 2014. Retrieved form https://web.archive.org/web/20140125042028/http://www.thedogoutdoors.com/ruffwear-slackline-adjustable-dog-leash.html.

"Stunt Puppy Everyday Dog Leash". Found online Nov. 8, 2017 at amazon.com. Page dated Aug. 24, 2014. Retrieved from https://www.amazon.com/dp/B004VP23LO/ref=psdc_3024193011_t3_B004VP23TQ.

U.S. Appl. No. 29/574,768, Nov. 14, 2017, Non-Final Office Action.

* cited by examiner

ANIMAL RESTRAINT DEVICE

RELATED APPLICATIONS

This application claims the benefit and priority to U.S. Provisional Application No.: 62/206,632 filed Aug. 18, 2015, which is incorporated herein by reference in its entirety.

FIELD

The embodiments discussed herein are related to animal restraint devices.

BACKGROUND

Choke collars have been widely dismissed by animal care professionals as inhumane and unnecessary. There have been many cases of animals with damaged windpipes, necks, and spines from choke collars. Furthermore, there is growing evidence that choke collars harm animals and are not necessary to properly train and manage an animal.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, an animal restraint device includes an elongated member, a first connector, a second connector, a collar loop, a third connector, and a fourth connector. The elongated member extends from a first end to a second end. The elongated member includes an interior surface and an exterior surface and includes a posterior length that includes a portion of the elongated member having the first end and a remaining length that includes a portion of the elongated member having the second end. The first connector is positioned at the first end. The second connector is attached to the elongated member and positioned at a first distance from the first end. The collar loop is formed from the posterior length through attachment of the first connector to the second connector. The third connector is positioned at the second end. The fourth connector is attached to the elongated member and is positioned at a second distance from the second end. The fourth connector is configured to be releasably attached to the third connector. The elongated member is configurable in an on-animal storage configuration in which one or more concentric loops are formed from the remaining length of the elongated member, the concentric loops are wrapped around the collar loop in a single rotational direction, portions of the interior surface of the remaining length are affixed to portions of the exterior surface of the collar loop or to the exterior surface of one concentric loop of the concentric loops, and the second end is connected to the exterior surface of an outer-most concentric loop of the concentric loops.

According to another aspect of an embodiment, an animal restraint device includes an elongated member, a first connector, a second connector, a third connector, a fourth connector, a first strip of hook-and-loop fasteners, and a second strip of hook-and-loop fasteners. The elongated member extends from a first end to a second end and includes an interior surface and an exterior surface. The first connector is at the first end that includes a first hoop. The second connector is positioned at a first distance from the first end. The second connector includes a closed buckle that is curved along a longitudinal direction of the elongated member and includes a slide element through which the elongated member is routed. The third connector is at the second end that includes a second hoop. The fourth connector is positioned at a second distance from the second end. The fourth connector includes an open-hook buckle that includes a hook element and a slide element through which the elongated member is routed. The first strip of hook-and-loop fasteners is affixed to the interior surface of the elongated member. The second strip of hook-and-loop fasteners is affixed to the exterior surface of the elongated member. The elongated member is configurable in at least an on-animal storage configuration and an operative configuration. In the on-animal storage configuration, the first strip is affixed to the second strip.

According to yet another aspect of an embodiment, a method of animal restraint device use includes forming a collar loop from a posterior length of an elongated member. The posterior length includes a portion of the elongated member from a first end of the elongated member to a second connector that is attached to the elongated member and positioned at a first distance from the first end. The method includes configuring the elongated member in an on-animal storage configuration. The configuring includes positioning the collar loop around a neck of an animal such that an interior surface of the posterior length contacts the neck of the animal, forming one or more concentric loops from an entire remaining length of the elongated member, and wrapping the concentric loops around the collar loop in a single rotational direction. The concentric loops may be wrapped such that portions of an interior surface of the remaining length are affixed to portions of an exterior surface of the collar loop or to the exterior surface of one concentric loop of the concentric loops. Additionally, concentric loops may be wrapped such that a second end of the elongated member is connected to the exterior surface of an outer-most concentric loop of the concentric loops.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

Figure 1A:
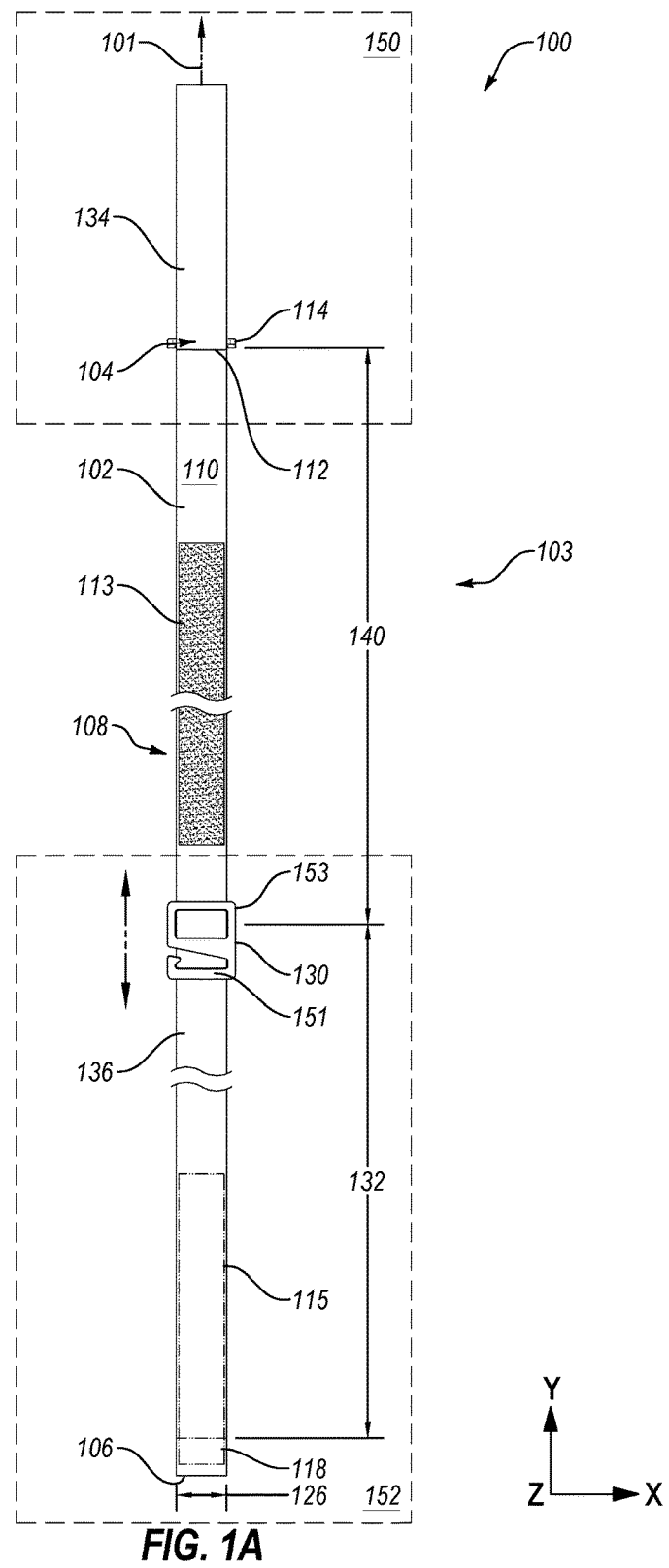
FIG. 1A illustrates an example animal restraint device (device)

Leashes are used to control animals. For example, leashes are often used when walking a dog. Additionally, a leash may be used to restrain the dog and/or to secure the dog to an object between walks. Leashes are generally separate from a collar. The collar is generally placed around a neck or another body part of the animal. The collar usually includes a D-ring or another attachment apparatus that enables the leash to be connected to the collar and to be disconnected from the collar between uses. Disconnection of the leash from the collar may introduce problems. For example, when the leash is disconnected from the collar, the leash may become lost or misplaced, which can cause frustration or unnecessary replacement of the leash. Alternatively, the leash may be left connected to the collar. The leash may then become snagged or caught as the animal moves around, which may be dangerous to the animal.

Accordingly, embodiments described in this disclosure include an animal restraint device that includes a combination animal collar and leash. Some embodiments of the animal restraint device may be configurable in an on-animal storage configuration and an operative configuration. In the on-animal storage configuration, a leash portion of the animal restraint device is secured to a collar portion of the animal restraint device. In the operative configuration, the leash portion of the animal restraint device extends from the collar portion of the animal restraint device while still being attached to the collar portion. A user may then hold the leash portion.

For example, some embodiments of the animal restraint device may be constructed from one continuous elongated member. A posterior length of the elongated member is formed into a collar loop. The collar loop can be formed through attachment of an adjustable closed buckle or "open-hook" buckle with a closed loop, for instance. The collar loop may be placed around a neck or another body part of an animal.

In the on-animal storage configuration, one or more concentric loops are formed from the remaining length of the elongated member. The concentric loops are wrapped around the collar loop. The concentric loops may be wrapped in a single rotational direction and/or may be wrapped back in an opposite direction upon itself. Portions of an interior surface of the remaining length are affixed to portions of an exterior surface of the collar loop or to the exterior surface of one concentric loop of the concentric loops. In the on-animal storage configuration, the entire remaining length may be formed into concentric loops, which are attached the collar loop. In the on-animal storage configuration, there may be limited or no loose ends of the elongated member. Accordingly, the animal restraint device can be stored on the animal in a way that reduces the chance of it being snagged or caught as the animal moves. In the on-animal storage configuration, the elongated member is wrapped around itself in the same direction it is threaded. Additionally, in the on-animal storage configuration, the elongated member is secured in place with one or more sections of hook and loop fasteners.

In the operative configuration, the concentric loops are unwrapped from the collar loop. Because the concentric loops are formed of the elongated member that also forms the collar loop, the unwrapped portion of the elongated member remains attached to the collar loop. A handle loop may be formed from an anterior length that includes a portion of the elongated member opposite the posterior length.

To transition the animal restraint device from the on-animal storage configuration and the operative condition, a user may apply a force an outer-most portion of the elongated member. The user may then continue to pull, which may rotate the elongated member around the body part of the animal as the elongated member lengthens. The user may then connect the open hook buckle and closed loop to create the handle loop. Additionally, in some embodiments the handle loop may be created through attachment between other types of fasteners such as snaps, buttons, and the like.

The collar loop does not create a choke collar. Accordingly, the perimeter of the collar loop is substantially fixed. For example, a longitudinal force applied to the leash by the user does not reduce the perimeter of the collar loop. Thus, a dog with the collar loop positioned around its neck is not choked by a reduction of the perimeter of the collar loop in response to a user pulling on the elongated member. Additionally, in some embodiments, the animal restraint device may include an elastic pocket that can be used to store poop bags, keys, or treats, for instance.

Some additional details of this and other embodiments are described with reference to the accompanying drawings in which like numbers indicate like features unless described otherwise.

Figure 1B:
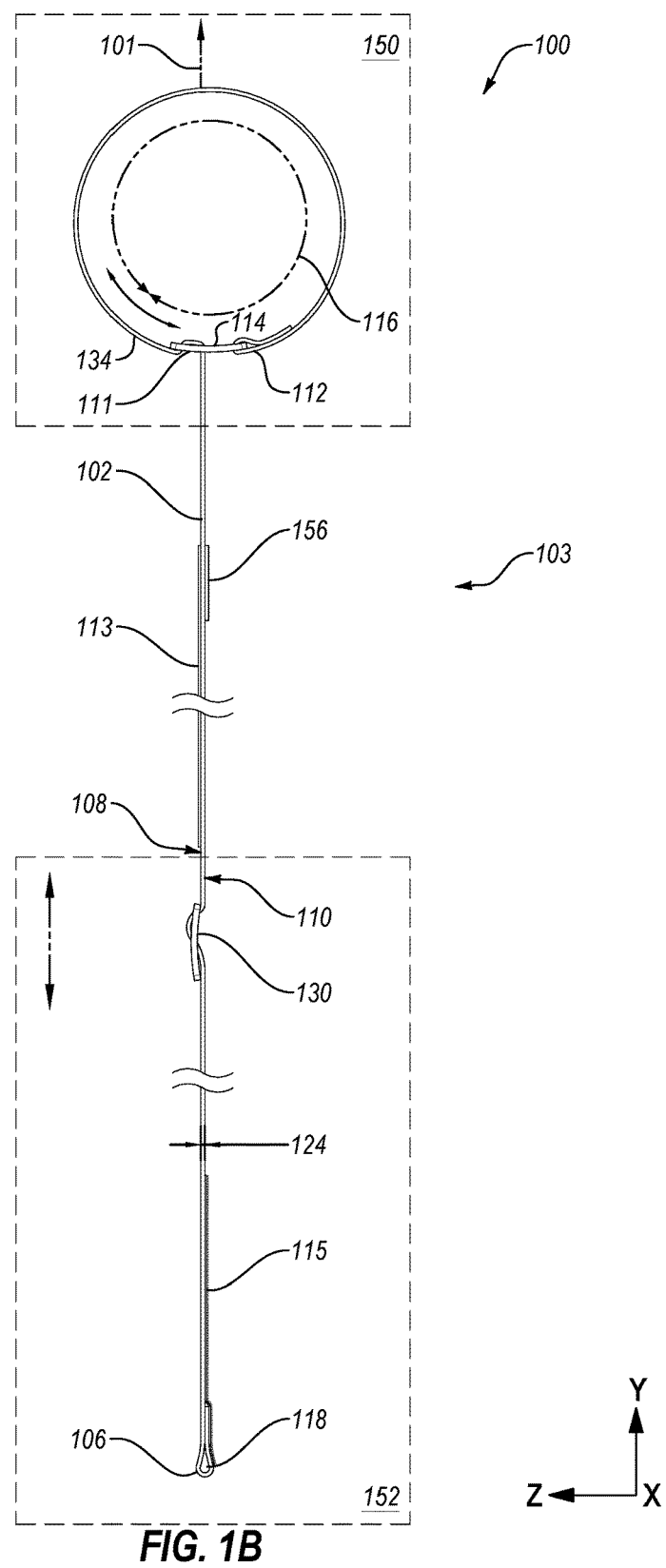
FIG. 1B illustrates another view of the device of FIG. 1A.

FIGS. 1A and 1B illustrate an example animal restraint device (device) 100 according to at least one embodiment described in this disclosure. The device 100 may be used as a leash for an animal and may be stored in an on-animal storage configuration between uses as a leash. The on-animal storage configuration may enable storage of the device 100 on the animal. While stored on the animal, a collar loop is positioned around a neck or another body part of the animal. The remaining length of the device 100 is wrapped in concentric loops around the collar loop. The concentric loops may be wrapped in a single rotational direction and/or back in an opposite upon itself. Portions of the remaining length are affixed to the collar loop or to the concentric loops. While stored on the animal, the device 100 may be substantially flat against the neck of the animal, which may reduce or prevent the device 100 from being caught on items as the animal moves.

The collar loop is adjustable but substantially fixed. For example, the perimeter length of the collar loop may be set by a user to fit or substantially fit around the neck of the animal. Once set, the perimeter of the collar loop may not be affected by forces acting in a longitudinal direction of the device 100, which is indicated in FIGS. 1A and 1B by arrow 101. Specifically, the perimeter length of the collar loop may not be reduced. Thus, the animal is not choked through reduction in the perimeter when a user pulls on the leash in the longitudinal direction 101.

In FIGS. 1A and 1B, the device 100 is depicted in an unrolled configuration 103. In the unrolled configuration 103, a handle loop, which is described elsewhere in the disclosure, is not formed. Some embodiments of the device 100 may be configurable in the unrolled configuration 103 in which both a collar loop and the handle loop may be unrolled. For instance, in these and other embodiments, the collar loop may be releasably formed such that the user is able to easily form and uniform the collar loop.

The device 100 of FIGS. 1A and 1B includes an elongated member 102. The elongated member 102 may include one continuous member or may include two or more members that are sewn or otherwise attached (e.g., glued, etc.) to form the elongated member 102. The elongated member 102 may be comprised of nylon, polyester, webbing, polypropylene, hemp, leather, combinations thereof, or some other suitable material for example. In some embodiments, the elongated member 102 may substantially comply with MIL-spec 17337.

The elongated member 102 may include a member length. The member length includes a sum of a second distance 132 (FIG. 1A), a length 140 (FIG. 1A) of an intermediate length 138, and a first distance 116 (FIG. 1B). In addition, the elongated member 102 may include a member width 126 (FIG. 1A) and a member thickness 124 (FIG. 1B). The member length may be much larger than the member width 126 and the member thickness 124. For example, in some embodiments, the member length may be between about five feet and about six feet, the member width 126 may be between about three-quarters inches about one and one-half inches, and the member thickness 124 may be between about 0.04 and about 0.1 inches.

In general, the elongated member 102 or lengths thereof may be wrapped to generate a collar loop and a handle loop. Additionally, the elongated member 102 may be wrapped to configure the device 100 in on-animal storage configuration. Some additional details of the on-animal storage configuration, the collar loop, and the handle loop are provided elsewhere in this disclosure.

The elongated member 102 may extend from a first end 104 to a second end 106. The first end 104 is opposite the second end 106. The elongated member 102 may include an interior surface 108 and an exterior surface 110. The interior surface 108 is a surface of the elongated member 102 that faces and/or contacts the animal when the device 100 is positioned on the animal. The exterior surface 110 is a surface of the elongated member 102 that faces away from the animal when the device 100 positioned on the animal.

FIG. 1A depicts the exterior surface 110 of the device 100. The interior surface 108 is the surface opposite the exterior surface 110. In some embodiments, the interior surface 108 of a device 100 may be substantially similar to the exterior surface 110 of the device 100 shown in FIG. 1A.

The device 100 of FIGS. 1A and 1B includes a first connector 112. The first connector 112 may be positioned at the first end 104. In the embodiment of FIGS. 1A and 1B, the first connector 112 includes a hoop. The hoop may include a hoop or loop of fabric that is sewn to the elongated member 102 or the hoop may be constructed of the material of a portion of the elongated member 102, for instance. In other embodiments, the first connector 112 may be another mechanical connector. For example, the first connector 112 may include an open-hook buckle, a closed buckle, snaps, buttons, a T-shaped buckle, or another mechanical connector.

The device 100 of FIGS. 1A and 1B includes a second connector 114. The second connector 114 is attached to the elongated member 102. For instance, the elongated member 102 may be routed through the second connector 114 or portion thereof.

The second connector 114 is positioned at the first distance 116 from the first end 104. The first distance 116 may change with the position of the second connector 114 relative to the first end 104. For example, the second connector 114 may be moved closer to or farther from the first end 104.

The second connector 114 is configured to be attached to the first connector 112. For example, in the depicted embodiment, the second connector 114 may include a closed buckle that is configured to be attached to the fabric hoop (the first connector 112). In some embodiments, the second connector 114 may include an open hook buckle (e.g., the fourth connector 130 described in this disclosure) that is configured to be releasably attached to the fabric hoop. Additionally, in some embodiments, the first connector 112 may include the open-hook buckle and the second connector 114 may include multiple hoops that are configured to receive a hook of the open-hook buckle and positioned at multiple distances (e.g., 116) from the first end 104. Similarly, the first connector 112 may include a T-shaped buckle. Accordingly, the second connector 114 may include one or more rectangular openings defined at multiple distances (e.g., 116) from the first end 104.

In some embodiments in which the second connector 114 includes the closed buckle or an open hook buckle, the second connector 114 is curved as best depicted in FIG. 1A. For example, the second connector 114 may be curved along the longitudinal direction 101. The second connector 114 may be positioned on the elongated member 102 such that a concave surface 111 is substantially parallel to or facing the same direction the interior surface 108 of the elongated member 102. When positioned on an animal the concave surface 111 may face and be substantially parallel to the neck or the body part of the animal.

The device 100 of FIGS. 1A and 1B includes a third connector 118. The third connector 118 may be positioned at the second end 106. In the embodiment of FIGS. 1A and 1B, the third connector 118 includes a hoop, which may be substantially similar to the first connector 112. For example, the third connector 118 may include a hoop of fabric that is sewn to the elongated member 102 or may be constructed of the material of the elongated member 102. In other embodiments, the third connector 118 may be another mechanical connector. For example, the third connector 118 may include an open-hook buckle or a T-shaped buckle in some embodiments.

The device 100 of FIGS. 1A and 1B includes a fourth connector 130. The fourth connector 130 is attached to the elongated member 102. For instance, the elongated member 102 may be routed through the fourth connector 130 or portion thereof.

The fourth connector 130 is positioned at the second distance 132 from the second end 106. The second distance 132 may change with the position of the fourth connector 130 relative to the second end 106. For example, the fourth connector 130 may be moved closer to or farther from the second end 106.

The fourth connector 130 is configured to be attached to the third connector 118. For example, in the depicted embodiment, the fourth connector 130 may include an open-hook buckle that is configured to hook through the fabric hoop (the third connector 118). The fourth connector 130 may include a hook element 151 and a slide element 153. The elongated member 102 is routed through the slide element 153. Placement of the hook element 151 in the third connector 118 may form the handle loop.

In some embodiments, the third connector 118 may include the open-hook buckle (similar to the fourth connector 130 or the second connector 114) and the fourth connector 130 may include multiple hoops that are configured to receive a hook of the open-hook buckle and positioned at multiple distances (e.g., 132) from the second end 106. Similarly, the third connector 118 may include a T-shaped buckle. Accordingly, the fourth connector 130 may include one or more rectangular openings defined at multiple distances (e.g., 132) from the second end 106.

In the depicted embodiment, a posterior length 134 of the device 100 includes a portion of the elongated member 102 that includes the first distance 116 from the first end 104. An anterior length 136 of the device 100 includes a portion of the elongated member 102 that includes the second distance 132 from the second end 106. Between the anterior length 136 and the posterior length 134 is the intermediate length 138. The length 140 of the intermediate length 138 may change based on the first distance 116 and the second distance 132, which may be based on the positions of the second connector 114 and/or the fourth connectors 130 relative to the first and second ends 104 and 106.

A collar portion 150 of the device 100 may include the posterior length 134, the first connector 112, and the second connector 114. The collar portion 150 may include the portion of the device 100 used to generate a collar loop, which may be positioned on an animal or body part thereof during use of the device 100.

For example, to generate the collar loop, the second connector 114 may be attached to the first connector 112. The perimeter of the collar loop may be set based on the distance 116 of the second connector 114 relative to the first end 104 (and the first connector 112). For example, to increase a perimeter of a collar loop, the second connector 114 may be moved along the elongated member 102 in a counter-clockwise direction about the x-axis of FIGS. 1A and 1B. To accommodate a smaller animal, the second connector 114 may be moved along the elongated member 102 in a clockwise direction about the x-axis of FIGS. 1A and 1B.

The perimeter of the collar loop may be adjustable through positioning the second connector 114, for example, as discussed in the immediately preceding example. However, the first and the second connectors 112 and 114 are configured to not change position in response to imposition of forces in the longitudinal direction 101 once set and the collar loop is generated. For example, after the collar loop is generated, e.g., the first connector 112 is engaged with the second connector 114 and the collar loop is positioned on an animal, a force imposed along the longitudinal direction 101 will generally act to move the animal rather than reduce the perimeter of the collar loop.

A handle portion 152 of the device 100 may include the anterior length 136, the third connector 118, and the fourth connector 130. The handle portion 152 may include the portion of the device 100 used to generate a handle loop, which may be attached to an object or held by a user when the device 100 is used as leash, which is referred to as an operative configuration.

In particular, to generate the handle loop, the hook of the fourth connector 130 may be positioned in the third connector 118. The perimeter of the handle loop may be set based on the distance 132 of the fourth connector 130 relative to the second end 106 (and the third connector 118). For example, to increase a perimeter of a handle loop, the fourth connector 130 may be moved in the positive y-direction in the arbitrarily-defined coordinate system of FIGS. 1A and 1B. To accommodate a larger user, for instance, the fourth connector 130 may be moved in the positive y-direction, which increases the perimeter of the handle loop.

The device 100 may further include one or more strips of hook-and-loop fasteners (strips) 113 and 115. The strips 113 and 115 may be attached to portions of the exterior surface 110 and the interior surface 108. The strips 113 and 115 are used to affix the portions of the elongated member 102 in the on-animal storage configuration as discussed below.

In some embodiments, the device 100 may include an elastic pocket 156. The elastic pocket 156 may be sewn onto the elongated member 102. For example, in the depicted embodiment, the elastic pocket 156 may be sewn onto the exterior surface 110 of the elongated member 102. The elastic pocket 156 may be sewn along two of the four edges such that the elastic pocket 156 includes a loop. The elastic pocket 156 may be used to store animal waste bags or animal identification documents, for instance.

The elastic pocket 156 is positioned near the fourth connector 130, which positions the elastic pocket 156 near a handle loop. For example, the elastic pocket 156 may be about one inch from the fourth connector 130. The fourth connector 130 can move along the elongated member 102, however, the elastic pocket 156 may lose some of its functionality if the fourth connector 130 is moved over it.

In some embodiments of the device 100, the third connector 118 is the open hook buckle. In addition, in these and other embodiments, the fourth connector 130 includes a set of loops of fabric that are sewn onto the interior surface 108 or the exterior surface 110 of the elongated member 102. The hook element is connected to one of the loops to form the handle loop (e.g., the handle loop 204). In some implementations, the first connector 112 may include an open hook buckle and the second connector 114 may include a set of loops of fabric. In these and other implementations a collar loop (e.g., the collar loop 202) may be formed through connecting the first connector 112 to the second connector 114.

In some embodiments of the device 100, the third connector 118 includes a T-shaped buckle attached to the second end 106. Additionally, the fourth connector 130 may include one or more rectangular openings. The rectangular openings may be defined at multiple distances from the second end 106. To connect the third connector 118 to the fourth connector 130, the T-shaped buckle is positioned in one of the rectangular opening and rotated. Rotation of the T-shaped buckle may retain a portion of the third connector 118.

In some embodiments of the device 100, the third connector 118 includes a T-shaped buckle attached to the second end 106. Additionally, the fourth connector 130 may include one or more rectangular openings. The rectangular openings may be defined at multiple distances from the second end 106. To connect the third connector 118 to the fourth connector 130, the T-shaped buckle is positioned in one of the rectangular opening and rotated. Rotation of the T-shaped buckle may retain a portion of the third connector 118.

Figure 2:
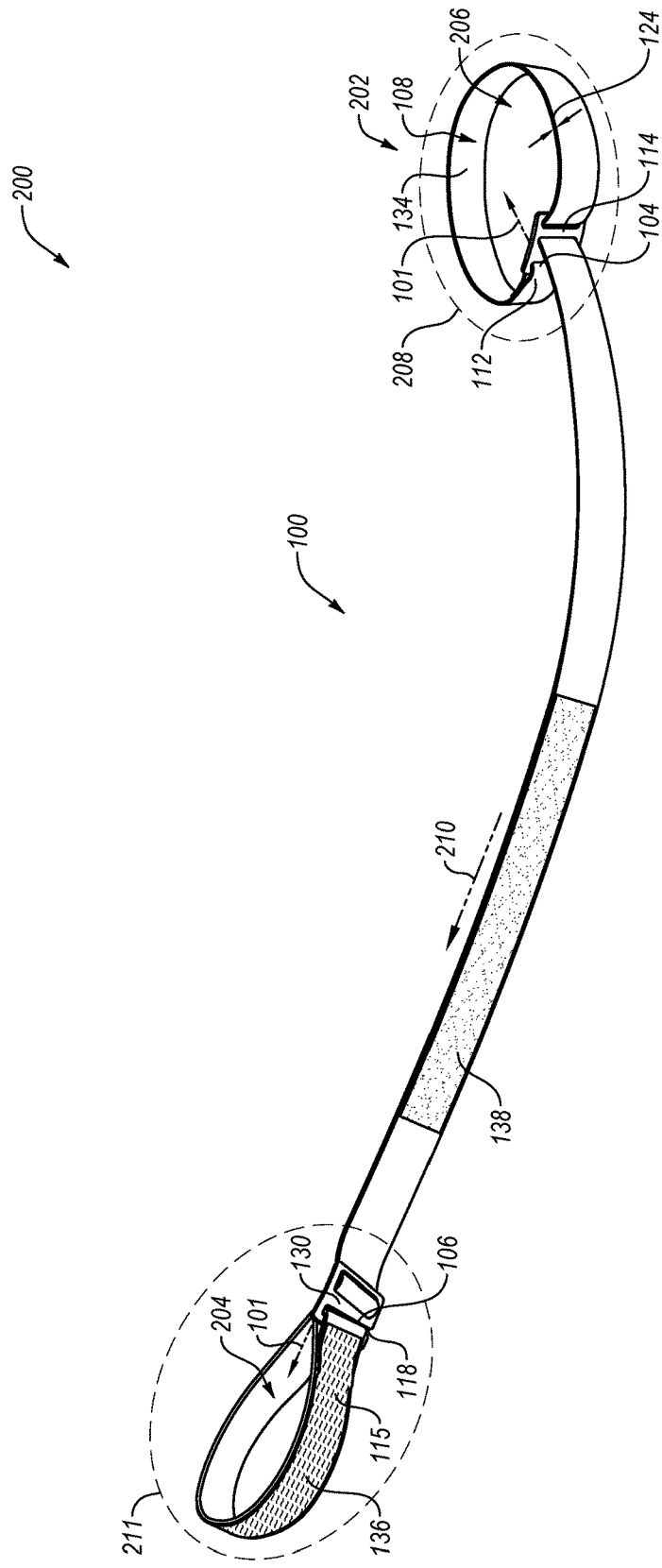
FIG. 2 illustrates an operative configuration of the device of FIGS. 1A and 1B.

FIG. 2 illustrates an operative configuration 200 of the device 100 of FIGS. 1A and 1B. The operative configuration 200 may include a configuration in which the device 100 is used as a leash. The operative configuration 200 includes a collar loop 202 connected to a handle loop 204 by the intermediate length 138. As discussed above, the collar loop 202 may be formed when the first connector 112 at the first end 104 is attached to the second connector 114. The collar loop 202 may be positioned around the neck or another body part of an animal (not shown). For example, the collar loop 202 may define a volume 206. The body part of the animal may be placed in the volume 206. When the body part of the animal is placed in the volume 206, the interior surface 108 of the posterior length 134 contacts the neck or the body party of the animal.

The intermediate length 138 may extend away from the collar loop 202. The intermediate length 138 and the device 100 may be substantially flexible. Accordingly, the intermediate length 138 may rotate and move relative to the collar loop 202. The collar loop 202 may include a perimeter 208 that is substantially fixed. Thus, in response to a force 210 being applied to the intermediate length 138 in substantially longitudinal direction, the perimeter 208 may not change. For example, the force 210 may be transferred to the collar loop 202, which may be further transferred to a body part of the animal positioned in the collar loop 202. The force 210 may be transferred in this way rather than reducing the perimeter 208 around the body part of the animal.

The handle loop 204 may be formed of a part of a remaining portion of the device 100 that is not included in the collar loop 202. The handle loop 204 may include an adjustable perimeter 211 similar to the perimeter 208. In some circumstances, the handle loop 204 may not formed. Instead in these circumstances, a user may just hold onto a portion of the elongated member 102 around the second end 106. A use of the handle loop 204 may include forming a handle that may be used to secure an animal to a permanent object.

Figure 3:
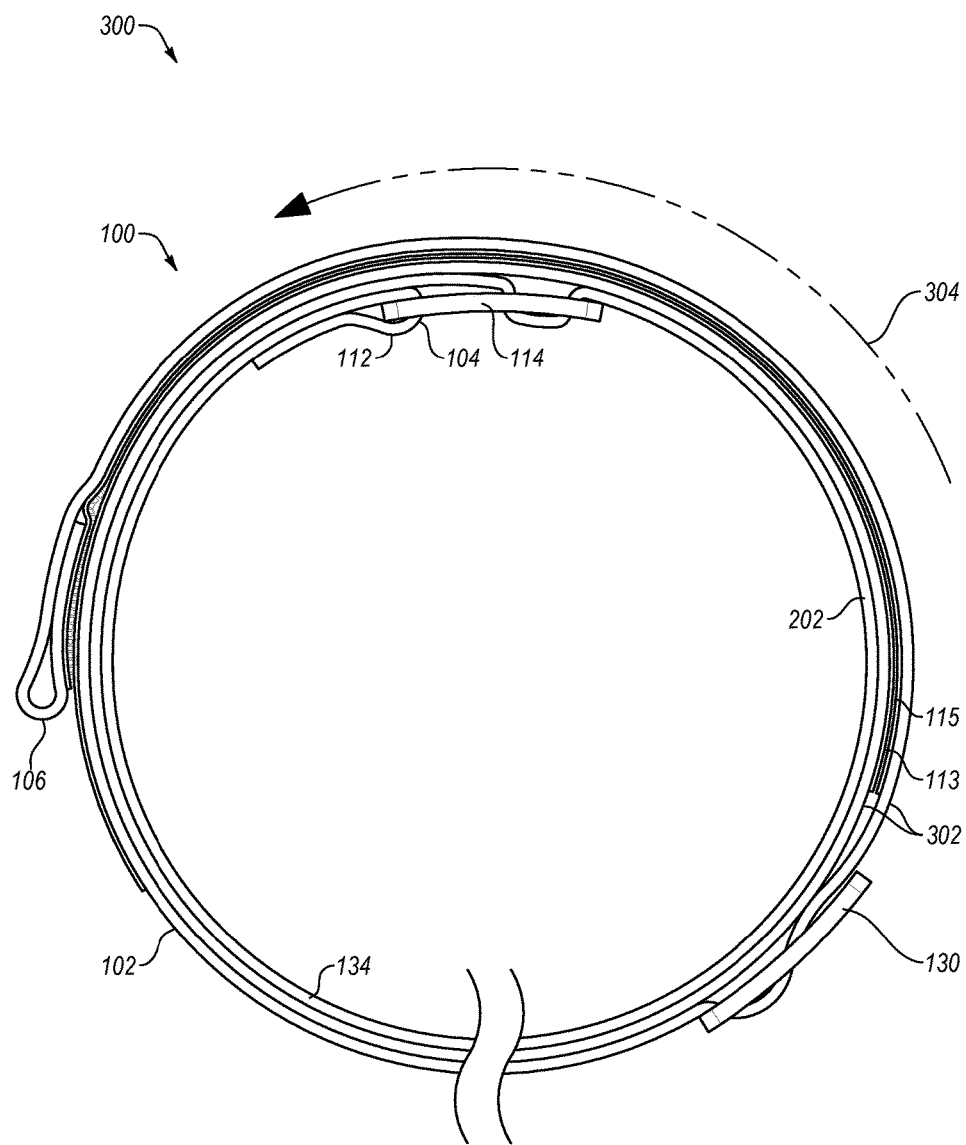
FIG. 3 illustrates an on-animal storage configuration of the device of FIGS. 1A and 1B.

FIG. 3 illustrates an on-animal storage configuration 300 of the device 100 of FIGS. 1A-2. In the on-animal storage configuration 300, the collar loop 202 may be formed from the posterior length 134 of the elongated member 102. The collar loop 202 may be positioned around a neck or another body part of an animal. When the collar loop 202 is positioned around the body part, the interior surface 108 of the posterior length 134 contacts or is substantially adjacent to the body part of the animal. One or more concentric loops 302 may be formed from an entire remaining length (e.g., 138 and 136) of the elongated member 102. The concentric loops 302 may wrap around the collar loop 202. The concentric loops 202 may be wrapped in a single rotational direction as shown in FIG. 3. The single rotational direction is represented in FIG. 3 by arrow 304. In the on-animal storage configuration 300, the collar loop 202 may be an inner-most loop. In some embodiments, the concentric loops 202 may be wrapped at least partially back upon itself, e.g., in a direction opposite the single rotational direction.

In the on-animal storage configuration 300, portions of the interior surface 108 of the remaining length 138 and 136 are affixed to portions of the exterior surface 110 of the collar loop 202 or to the exterior surface 110 the concentric loops 302. Additionally, the second end 106 is connected to the exterior surface 110 of an outer-most concentric loop of the concentric loops 302.

The second end 106 is connected to the exterior surface 110 of an outer-most of the concentric loops. Accordingly, in the on-animal storage configuration 300, the entire elongated member 102 is substantially wrapped and affixed to itself. Accordingly, substantially no portions of the elongated member 102 are wrapped in a rotational direction opposite the single rotational direction and substantially no portions of the elongated member 102 are loose in the on-animal storage configuration 300.

As discussed with reference to FIGS. 1A and 1B, the strips 113 and 115 may be attached to portions of the exterior surface 110 and the interior surface 108. The strips 113 and 115 are used to affix the portions of the elongated member 102 in the on-animal storage configuration 300.

To transition from the on-animal storage configuration 300 of FIG. 3 to the operative configuration 200 of FIG. 2, the collar loop 202 may remain positioned around the body party or neck of the animal. The intermediate length 138 of the remaining length 138 and 136 is unwrapped from the collar loop 202 such that it is separate from and extends away from the collar loop 202. The handle loop 204 may be formed of the anterior length 136 of the elongated member 102 by connecting the third connector 118 and the fourth connector 130. During the transition from the on-animal storage configuration 300 to the operative configuration 200, the perimeter 208 of the collar loop 202 may remain substantially fixed. In addition, during the transition from the on-animal storage configuration 300 to the operative configuration 200, the collar loop 202 may rotate around the neck or body part of the animal as the remaining length 138 and 136 is unwrapped.

Figure 4:
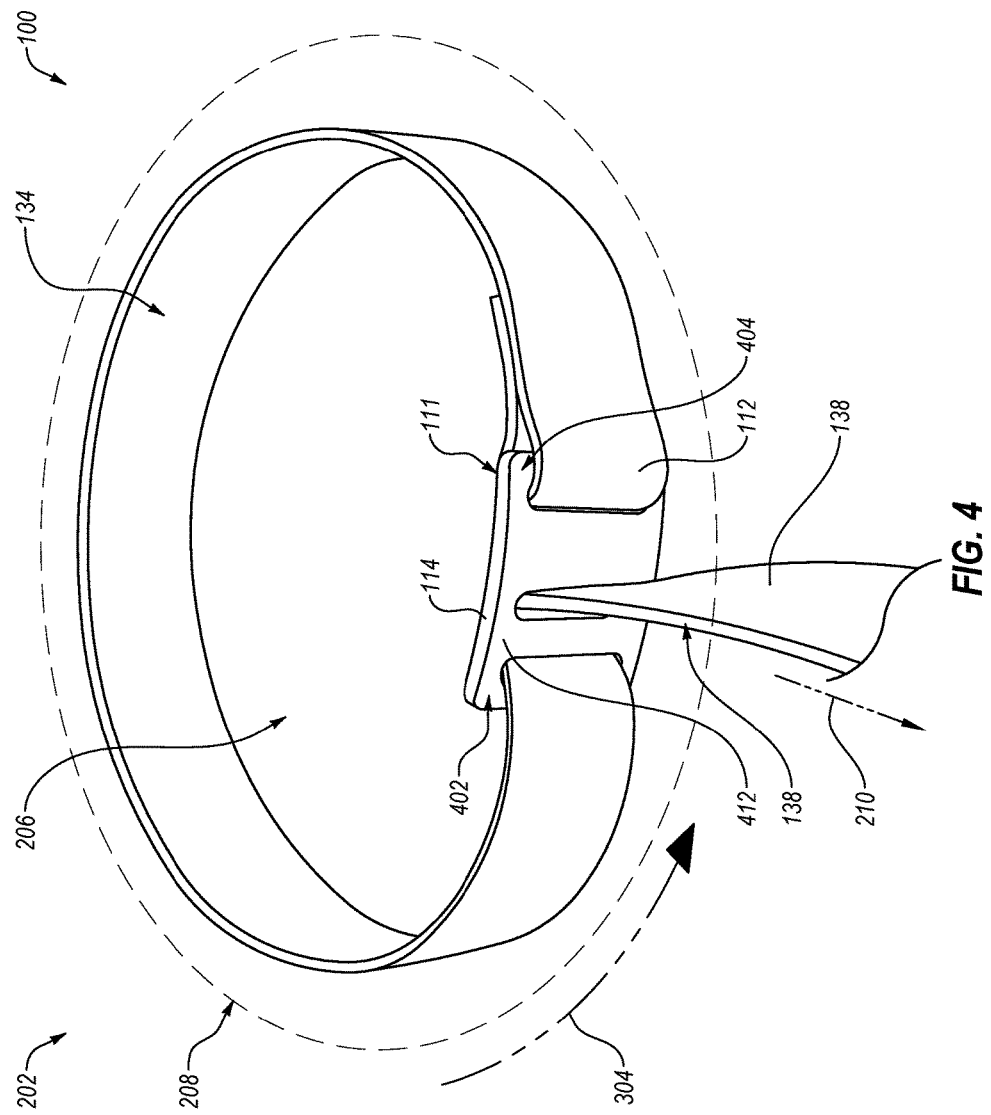
FIG. 4 illustrates a collar loop of the device of FIGS. 1A and 1B.

FIG. 4 illustrates an example of the collar loop 202 of the device 100 of FIGS. 1A and 1B. The second connector 114 includes a closed buckle with a slide element 402. The posterior length 134 is routed through the slide element 402 of the closed buckle. The posterior length 134 is routed through the slide element 402 in a direction consistent with the single rotational direction 304. The position of the second connector 114 may be moved along the length of the elongated member 102 to change the perimeter 208 of the collar loop 202.

The slide element 402 may be configured such that when the force 210 is applied to the intermediate length 138, the force 210 is not transferred to the posterior length 134 that may result in reduction in the perimeter 208 of the collar loop 202. For example, an opening of the slide element 402 through which the elongated member 102 exits the slide element 402 may be sized to apply friction to the elongated member 102. Additionally, an angle at which the elongate member 102 exits the slide element 402 may increase friction between the elongated member 102 and the second connector 114.

The second connector 114 may also include an attachment element 404. The attachment element 404 is depicted in FIG. 4 connected to the first connector 112, which includes a hoop of fabric of the elongated member 102. The connection between the first connector 112 and the second connector 114 may be formed by sewing the hoop of fabric (the first connector 112) around the attachment element 404. In FIG. 4, a tag such as an identification tag is visible.

In addition, in FIG. 4, the curve of the second connector 114 is visible. As described elsewhere in this disclosure, the concave surface 111 faces the volume 206 defined by the collar loop 202. The curve may increase the comfort of the animal wearing the device 100. In addition the edges of the second connector 114 may be curved such that no sharp edges contact the animal wearing the device and the elongated member 102 is not untimely worn.

In some embodiments, a tag opening may be defined in the second connector 114. The tag opening is configured to receive a tag of the animal such as an ID tag. The tag opening may be defined in a protrusion that extends from a body 412 of the closed buckle. Inclusion of the tag opening on the second connector 114 increases the overall utility of the second connector 114. In some embodiments, the second connector 114 may not include the tag opening. In these embodiments, another fitting may be added to the elongated member 102 to receive the tag of the animal.

In some embodiments, the fourth connector 130 or another connector (e.g., 112 and/or 118 depending on configuration) may be curved and/or may include a tag opening. The curve may be in substantially the same direction as the curve of the second connector 114 or another of the connectors. In addition, in other embodiments, the second connector 114 may include an open hook buckle. In these and other embodiments, the second connector 114 may be configured to be releasably attached to the first connector 112.

Figure 5:
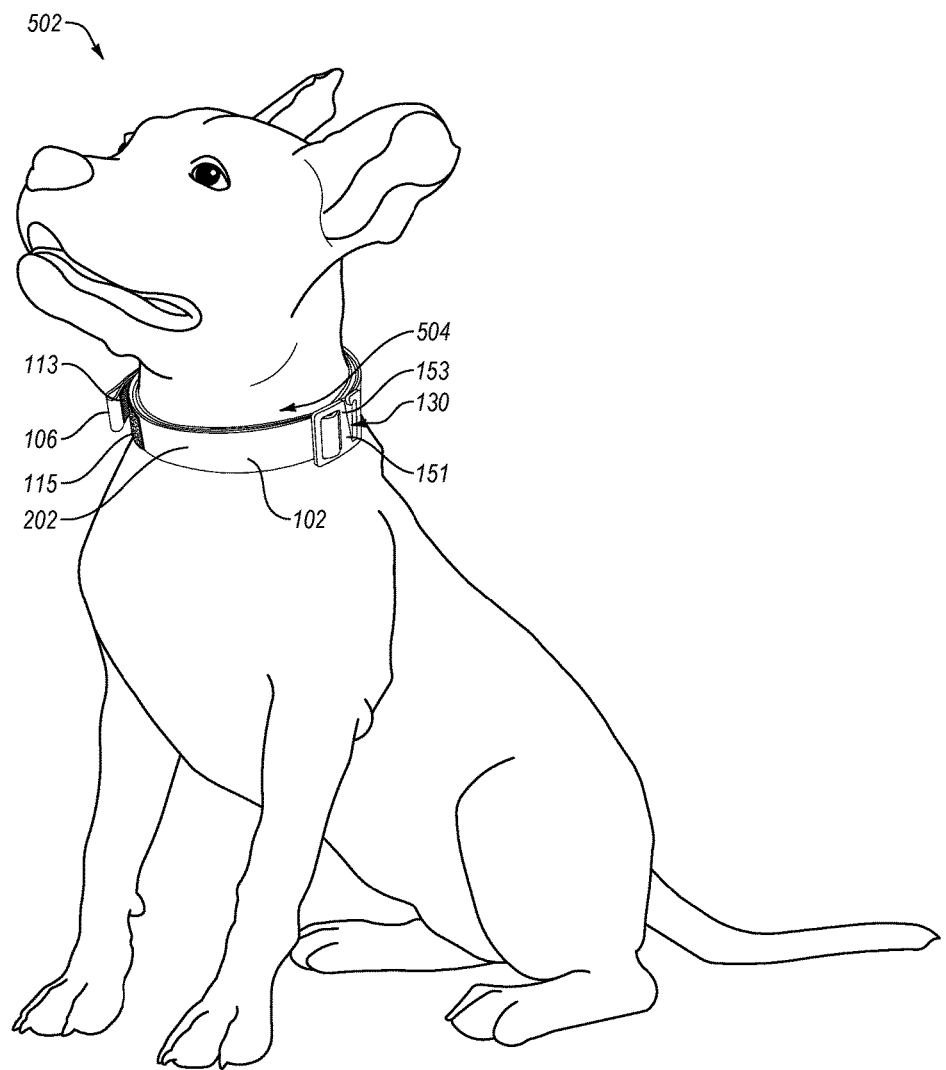
FIG. 5 illustrates the device of FIGS. 1A and 1B positioned on a dog.

FIG. 5 illustrates the device 100 positioned on a dog 502. In FIG. 5, the device 100 is in an on-animal storage configuration 300 described elsewhere in this disclosure. The device 100 is positioned around the neck 504 of the dog 502. In FIG. 5, the fourth connector 130 is visible. The fourth connector 130 includes an open-hook buckle. The open-hook buckle includes the slide element 153 and a hook element 151. The hook element 151 may be configured to be selectively and releasably positioned in the third connector 118 of FIGS. 1A and 1B.

The entire elongated member 102 is wrapped the collar loop 202 and thus around the dog 502. Accordingly, in the on-animal storage configuration 300, the elongated member 102 does not include portions that are loose or free. Free portions or loose portions may be snagged as the dog 502 moves around. Additionally, an owner of the dog 502 or another user does not have to search for the device 100 when it is time to take a walk. Instead, the owner or the other user may simple convert the device 100 from the on-animal storage configuration 300 to the operative configuration 200 (of FIG. 2) and take the dog 502 for a walk.

Figure 6:
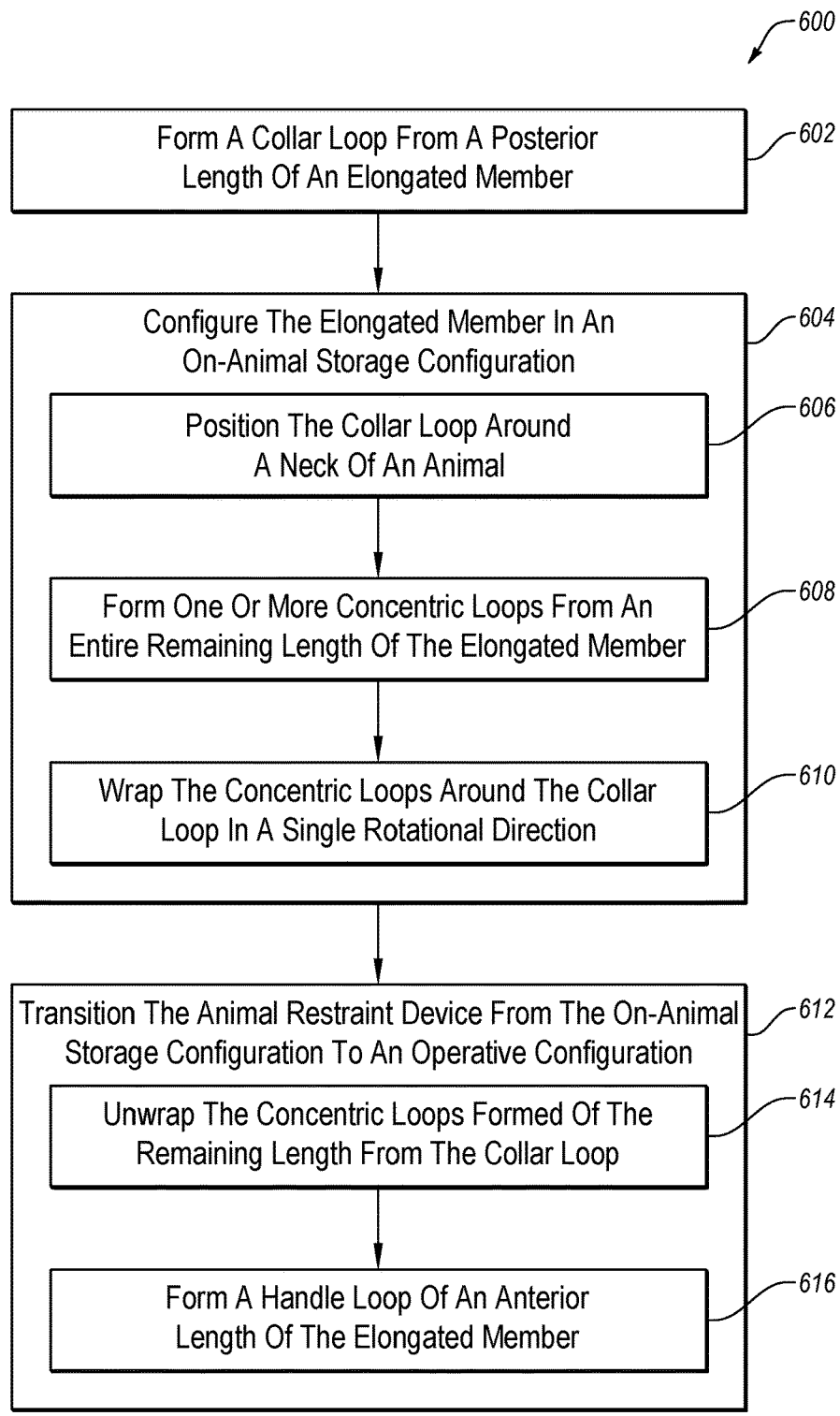
FIG. 6 is a flow chart of an example method of use of an animal restraint device, all in accordance with at least one embodiment described herein.

FIG. 6 is a flow chart of an example method 600 of animal restraint device use. Although illustrated as discrete blocks, various blocks in FIG. 6 may be divided into additional blocks, combined into fewer blocks, or eliminated, depending on the desired implementation.

The method 600 may begin at block 602 in which a collar loop is formed from a posterior length of an elongated member. The posterior length includes a portion of the elongated member from a first end of the elongated member to a second connector that is attached to the elongated member and positioned at a first distance from the first end.

At block 604, the elongated member may be configured in an on-animal storage configuration. The configuring of block 604 may include one or more sub-blocks 606, 608, and 610. At sub-block 606, the collar loop may be positioned around a neck of an animal such that an interior surface of the posterior length contacts the neck of the animal. At sub-block 608, one or more concentric loops may be formed from an entire remaining length of the elongated member. At sub-block 610, the concentric loops may be wrapped around the collar loop. The concentric loops may be wrapped in a single rotational direction in some embodiments. The concentric loops or some portion thereof may also be wrapped in an opposite rotational direction, back upon itself. The concentric loops may be wrapped such that portions of an interior surface of the remaining length are affixed to portions of an exterior surface of the collar loop or to the exterior surface of one concentric loop of the concentric loops. Additionally, the concentric loops may be wrapped such that a second end of the elongated member is connected to the exterior surface of an outer-most concentric loop of the concentric loops.

At block 612, the animal restraint device may be transitioned from the on-animal storage configuration to an operative configuration. The transitioning of block 612 may include one or more sub-blocks 614 and 616. At sub-block 614 the concentric loops formed of the remaining length may be unwrapped from the collar loop. The concentric loops may be unwrapped such that the remaining length extends away from the collar loop. In some embodiments, while unwrapping the concentric loops, the collar loop remains positioned around the neck of the animal and a perimeter of the collar loop remains substantially fixed. At sub-block 616, a handle loop may be formed of an anterior length of the elongated member by attaching a third connector to a fourth connector.

The animal restraint device may be further transitions from the operative configuration to the on-animal storage configuration. Such transition may include one or more of steps or sub-steps 602, 604, 606, 608, and 610.

The present invention may be embodied in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An animal restraint device comprising:
    an elongated member that extends from a first end to a second end, includes an interior surface and an exterior surface, and includes a posterior length that includes a portion of the elongated member having the first end and a remaining length that includes a portion of the elongated member having the second end;
    a first connector that is positioned at the first end;
    a second connector that is attached to the elongated member and positioned at a first distance from the first end;
    a collar loop formed from the posterior length through attachment of the first connector to the second connector;
    a first strip of hook-and-loop fasteners that is affixed to a portion of the interior surface of the elongated member; and
    a second strip of hook-and-loop fasteners that is affixed to a portion of the exterior surface of the elongated member,
    a third connector that is positioned at the second end; and
    a fourth connector that is attached to the elongated member and is positioned at a second distance from the second end, the fourth connector being configured to be releasably attached to the third connector,
    wherein the elongated member is configurable in an on-animal storage configuration in which:
        one or more concentric loops are formed from the remaining length of the elongated member,
        the first strip is affixed to the second strip,
        the concentric loops are wrapped around the collar loop in a single rotational direction,
        portions of the interior surface of the remaining length are affixed to portions of the exterior surface of the collar loop or to the exterior surface of one concentric loop of the concentric loops, and
        the second end is connected to the exterior surface of an outer-most concentric loop of the concentric loops.

2. The animal restraint device of claim 1, wherein the second connector includes a closed buckle or an open hook buckle and a section of the remaining length is routed through a portion of the second connector such that a longitudinal force applied to the remaining length does not reduce a perimeter of the collar loop.

3. The animal restraint device of claim 1, further comprising
    a handle loop that is formed from an anterior length that includes a portion of the elongated member between the second end and the fourth connector.

4. The animal restraint device of claim 3, wherein the handle loop is formed through a connection between the third connector and the fourth connector.

5. The animal restraint device of claim 4, wherein:
the second connector includes one of a closed buckle or an open hook buckle that is curved along a longitudinal direction of the elongated member;
the second connector includes a slide element; and
the elongated member is routed through the slide element.

6. The animal restraint device of claim 4, wherein:
the third connector includes a hoop that is formed of a material of the elongated member;
the fourth connector includes an open-hook buckle that includes a hook element and a slide element through which the elongated member is routed; and
placement of the hook element in the hoop forms the handle loop.

7. The animal restraint device of claim 1, wherein:
the second connector is a closed buckle;
the second connector is curved along a longitudinal direction of the elongated member;
the closed buckle includes a slide element;
the elongated member is routed through the slide element; and
the single rotational direction is the direction in which the elongated member is routed through the slide element.

8. An animal restraint device comprising:
an elongated member that extends from a first end to a second end and includes an interior surface and an exterior surface;
a first connector at the first end that includes a first hoop;
a second connector positioned at a first distance from the first end, the second connector includes a closed buckle that is curved along a longitudinal direction of the elongated member and that includes a slide element through which the elongated member is routed;
a third connector at the second end that includes a second hoop;
a fourth connector positioned at a second distance from the second end, the fourth connector includes an open-hook buckle that includes a hook element and a slide element through which the elongated member is routed;
a first strip of hook-and-loop fasteners that is affixed to the interior surface of the elongated member; and
a second strip of hook-and-loop fasteners that is affixed to the exterior surface of the elongated member, wherein:
the elongated member is configurable in at least an on-animal storage configuration and an operative configuration; and
in the on-animal storage configuration, the first strip is affixed to the second strip.

9. The animal restraint device of claim 8, further comprising a collar loop formed from a posterior length of the elongated member between the first end and the second connector wherein in the on animal storage configuration:
the collar loop is formed through attachment of the first connector to the second connector;
the collar loop is positioned around a neck of an animal such that the interior surface of the posterior length contacts the neck of the animal;
one or more concentric loops are formed from a remaining length of the elongated member;
the concentric loops are wrapped around the collar loop in a single rotational direction;
portions of the interior surface of the remaining length are affix to portions of the exterior surface of the collar loop or to the exterior surface of one concentric loop of the concentric loops; and
the second end is connected to the exterior surface of an outer-most concentric loop of the concentric loops.

10. The animal restraint device of claim 9, further comprising
an intermediate length that includes a portion of the elongated member between the second connector and the fourth connector, the intermediate length being configured to be unwrapped from the collar loop and to extend away from the collar loop.

11. The animal restraint device of claim 10, further comprising
a handle loop formed of an anterior length of the elongated member between the fourth connector and the third connector; and
the handle loop formed by a connection between the third connector and the fourth connector.

12. The animal restraint device of claim 11, wherein:
the second connector includes a closed buckle or an open hook buckle and a first section of the remaining length is routed through a portion of the second connector such that a perimeter of the collar loop is adjustable by repositioning of the second connector along the elongated member; and
the fourth connector includes a closed buckle or an open hook buckle and a second section the remaining length is routed through a portion of the fourth connector such that a perimeter of the handle loop is adjustable by repositioning of the fourth connector along the elongated member.

13. The animal restraint device of claim 9, wherein the single rotational direction is the direction in which the elongated member is routed through the slide element of the second connector.

14. The animal restraint device of claim 8, further comprising a collar loop that is formed from a posterior length of the elongated member between the first end and the second connector, the collar loop being formed through attachment of the first connector to the second connector, wherein the second connector substantially fixes a perimeter of the collar loop such that a longitudinal force applied to the remaining length does not reduce the perimeter of the collar loop.

15. The animal restraint device of claim 8, further comprising an elastic pocket sewn onto the elongated member.

16. A method of animal restraint device use, the method comprising:
forming a collar loop from a posterior length of an elongated member through attachment of a first connector to a second connector, the posterior length including a portion of the elongated member from a first end of the elongated member to the second connector that is attached to the elongated member and positioned at a first distance from the first end; and
configuring the elongated member in an on-animal storage configuration, the configuring including:
positioning the collar loop around a neck of an animal such that an interior surface of the posterior length contacts the neck of the animal;
affixing a first strip of hook-and-loop fasteners to a second strip of hook-and-loop fasteners, the first strip being affixed to a portion of an interior surface of the elongated member, and the second strip being affixed to a portion of an exterior surface of the elongated member;
forming one or more concentric loops from an entire remaining length of the elongated member; and
wrapping the concentric loops around the collar loop in a single rotational direction, such that portions of an interior surface of the remaining length are affixed to portions of an exterior surface of the collar loop or to the exterior surface of one concentric loop of the concentric loops and a second end of the elongated member is connected to the exterior surface of an outer-most concentric loops of the concentric loops.

17. The method of claim 16, further comprising:
transitioning the animal restraint device from the on-animal storage configuration to an operative configuration; the transitioning including:
unwrapping the concentric loops formed of the remaining length from the collar loop such that the remaining length extends away from the collar loop, wherein while unwrapping the concentric loops, the collar loop remains positioned around the neck of the animal and a perimeter of the collar loop remains substantially fixed; and
forming a handle loop of an anterior length of the elongated member by attaching a third connector to a fourth connector.

* * * * *